E. H. RIOPEL.
AUTO LIFT.
APPLICATION FILED OCT. 11, 1912.
1,091,390. Patented Mar. 24, 1914.
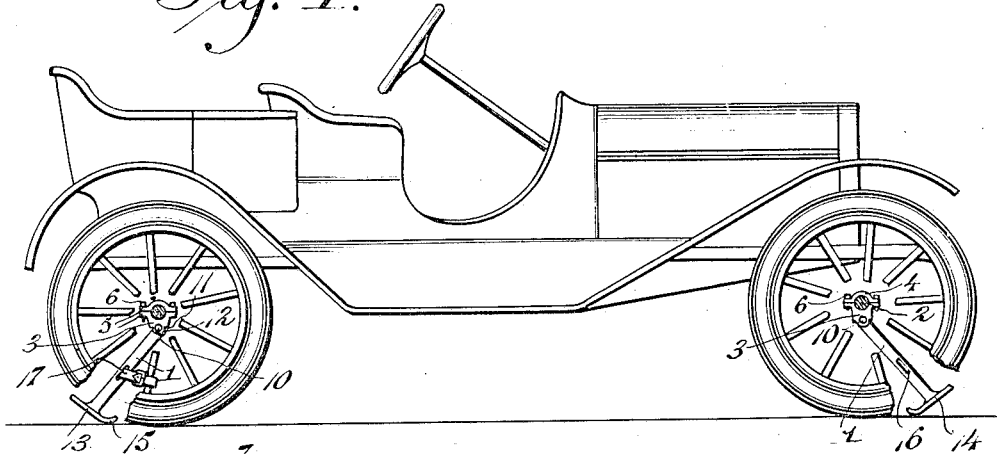
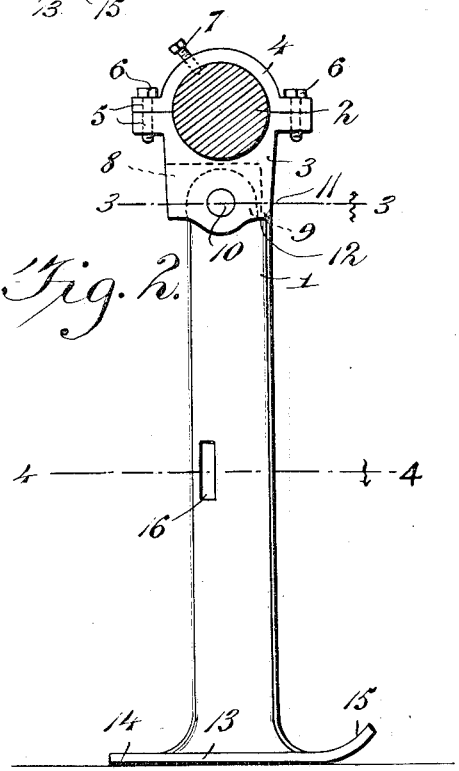
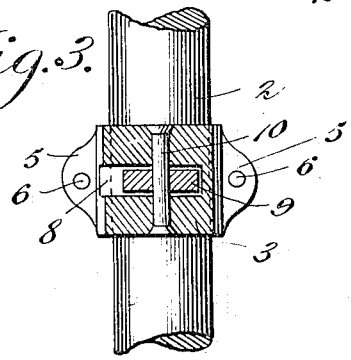
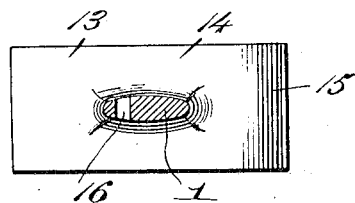
Witnesses
W. S. McDowell
P. M. Smith
Inventor
Edward H. Riopel
By Victor J. Evans
Attorney

UNITED STATES PATENT OFFICE.

EDWARD H. RIOPEL, OF EAST HAMPTON, NEW YORK.

AUTO-LIFT.

1,091,390.  Specification of Letters Patent.  Patented Mar. 24, 1914.

Application filed October 11, 1912. Serial No. 725,344.

*To all whom it may concern:*

Be it known that I, EDWARD H. RIOPEL, a citizen of the United States, residing at East Hampton, in the county of Suffolk and State of New York, have invented new and useful Improvements in Auto-Lifts, of which the following is a specification.

This invention relates to automobile lifts, the object in view being to provide a device in the form of an attachment to the axle of an automobile, whereby in the movement of the automobile on its wheels, the desired axle thereof may be elevated a suitable distance to carry the wheel clear of the ground, the attachment forming a part of the machine, and being carried on the same at all times, so as to be ready for immediate use whenever needed.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a side elevation, showing lifts applied to both of the axles of an automobile. Fig. 2 is an enlarged side elevation of one of the lifts showing the axle in cross section. Fig. 3 is a cross section through the lift on the line 3—3 of Fig. 2. Fig. 4 is a cross section on the line 4—4 of Fig. 2.

The lift contemplated in this invention comprises essentially a supporting standard or leg 1, which has a jointed and folding connection with the axle 2 of an automobile.

In order to attach the supporting standard to the axle of the machine, the standard or leg 1 is provided at the upper end thereof with an axle clip, embodying a base section 3 and a cap section 4, the two sections together embracing the axle and being provided with laterally extending lugs 5, through which clamping bolts or screws 6 are inserted. The clip is also provided with a set screw 7 adapting the same to be fastened to the axle of the automobile to prevent the clip from turning thereon. In its lower side, the clip is provided with a socket 8 which is designed to receive a rounded lug or extension 9 on the upper end of the standard 1, the two parts of the device being connected together pivotally by means of a pin 10.

In order to limit the swinging movement of the section 1 on the pivot 10, the axle clip is provided with a limiting shoulder 11, and the standard is provided with a corresponding and coöperating limiting shoulder 12, so that when the shoulders 11 and 12 come together, after the manner of a rule joint, the swinging movement of the supporting standard 1 will be limited, the standard at such time being in a substantially vertical position.

At its base, the standard is provided with a broad foot 13, comprising, in the preferred embodiment of the invention, a straight heel portion 14 and an upturned toe portion 15, upon which the device as a whole is adapted to rock, as the machine is pushed on its wheels, and caused to mount the standard.

At a point intermediate its ends, the standard is provided with a strap slot 16, through which is inserted a strap 17, said strap being fastened to the standard and serving to connect said standard with the adjacent wheel, preferably one of the spokes of the wheel, so that the machine may be caused to elevate itself by its own power.

In operation, the standard 1 is lowered until the upturned toe portion 15 thereof rests in contact with the ground. The machine is then either pushed by hand or propelled by its own power in the direction of the standard, until the standard assumes a vertical position, whereupon the shoulders 11 and 12 will come into contact with each other, after the wheels have left the ground. The strap 17 prevents the driving wheels from spinning around when elevating the rear axle.

When the device is not in use, the standard 1 is folded up, and the strap 17 may be utilized to connect the device as a whole to one of the vehicle springs or other convenient part.

Under the preferred embodiment of the invention, two of such lifts will be connected to each axle of the machine, and the rear lifts arranged to fold upward to the rear, while the front lifts will be arranged to fold upward toward the front of the machine.

What is claimed is:

An automobile lift comprising an axle elevating and supporting standard, an axle clip adapted to be fastened in fixed relation to the machine axle and embodying a downwardly extending socket in which the upper extremity of said standard is received and pivoted, said standard being adapted to swing only in a plane parallel to the longitudinal axis of the machine, coöperating stop shoulders on said standard and clip serving to limit the pivotal movement of the standard in one direction, an extended foot at the bottom of said standard, and a flexible strap attached to said standard and adapted to be passed around a wheel spoke and fastened.

In testimony whereof I affix my signature in presence of two witnesses.

EDWARD H. RIOPEL.

Witnesses:
WIELBY E. BOUGHTON,
SAMUEL CLINE.